United States Patent Office 3,349,151
Patented Oct. 24, 1967

3,349,151
PREPARATION OF PHOSPHORUS COMPOUND CONTAINING FLUORINE
Charles F. Baranauckas, Niagara Falls, and Arlen W. Frank, Grand Island, N.Y., assignors to Hooker Chemical Corporation, Niagara Falls, N.Y., a corporation of New York
No Drawing. Filed Feb. 17, 1964, Ser. No. 345,115
6 Claims. (Cl. 260—986)

ABSTRACT OF THE DISCLOSURE

A process for the preparation of phosphorus containing compounds containing a P—F bond, in which a phosphorus compound having the formula:

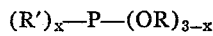

where R is selected from the group consisting of alkyl, aralkyl, alkenyl, substituted alkyl, substituted aralkyl, substituted alkenyl, said substitutent in each instance, if any, being inert under conditions of reaction, and mixtures thereof, R' is selected from the group consisting of R and aryl, substituted aryl, said substituent, if any being inert under conditions of reaction, and mixtures thereof, and $x$ is 0 to 2, and a halocarbon wherein at least one fluorine and one other halogen are on adjacent carbons.

This invention relates to the preparation of compounds containing phosphorus and halogen. More particularly, this invention relates to the replacement of an ester radical of a phosphorus compound with fluorine from a halocarbon containing fluorine. Fluorides of phosphorus compounds, such as dialkyl phosphorofluoridates, alkyl alkylphosphonofluoridates and dialkylphosphinic fluorides are usually prepared from their corresponding chlorides by some means of halogen exchange. However, the products formed by these methods in many instances contain significant quantities of chlorine due to incomplete reactions. The compounds formed by the process of the present invention are useful as insecticides, fungicides, bactericides, disinfectants, general clinical application, and chemical intermediates.

It is an object of this invention to prepare fluorine-containing phosphorus compounds in high yields.

Another object of this invention is to prepare phosphorofluoridates, phosphonofluoridates, and phosphinic fluorides, so that they may be readily separated from the reaction mixture.

Further, another object of this invention is to prepare haloolefins which may be readily separated from the reaction mixture.

In accordance with the invention it has been found that a phosphorus compound having a P—F bond and haloolefins may be formed by reacting a phosphorus compound having the formula

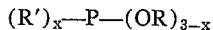

where R is selected from the group consisting of alkyl having from 1 to about 20 carbons, aralkyl having from 7 to about 20 carbons, alkenyl having from 2 to about 20 carbons, substituted alkyl having from 1 to about 20 carbons, said substituent, if any, being inert under conditions of reaction, substituted aralkyl having from 7 to about 20 carbons, said substituent, if any, being inert under conditions of reaction, substituted alkenyl having from 2 to about 20 carbons, said substituent, if any being inert under conditions of reaction, and mixtures thereof, R' is selected from the group consisting of R and aryl having from about 6 to about 24 carbons, substituted aryl having 6 to about 24 carbons, said substituent, if any, being inert under conditions of reaction, and mixtures thereof, and $x$ is 0 to 2, with a halocarbon having from 2 to about 1000 carbons wherein at least one fluorine and one other halogen selected from the group consisting of chlorine, bromine and iodine are on adjacent carbons.

The reaction of this invention may be illustrated by the equations:

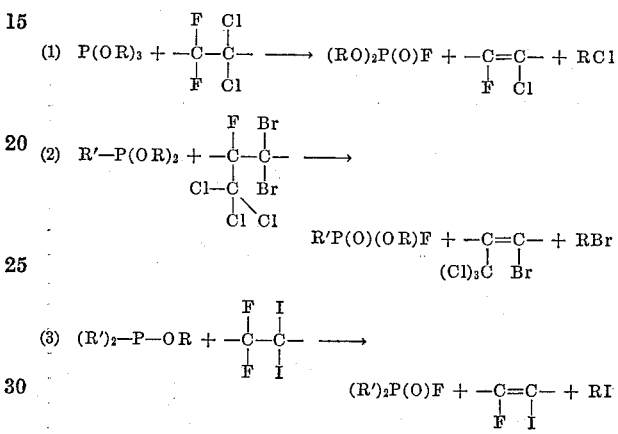

In each of the above instances the remaining valences of the moieties are satisfied by halocarbon radicals. R and R' are as defined above.

From the above equations it is apparent that the halocarbon reagent has a fluorine and halogen other than fluorine on adjacent carbons.

While it is understood that the halocarbon may contain chlorine, bromine or iodine on adjacent carbons, the preferred halocarbons are those wherein these halogens are not present on both adjacent carbons. The products formed by this reaction may be readily separated by known techniques, e.g., distillation, filtration, crystallization and so forth.

The reactions illustrated above will proceed as herein described irrespective of the number of carbons in the halocarbon or the halogen groups bonded to the carbons. It is realized that some of the haloolefins themselves may polymerize. The occurrence of such polymerization however, will not interfere with one of the surprising features of the invention; that an ester group in the phosphorus containing compound may be replaced with fluorine. Further, the polymerization, if it does occur, will not interfere with the recovery of the fluorine containing phosphorus compound formed during the reaction.

Although the number of carbon atoms in the halocarbon is not critical it is preferred to utilize a halocarbon having from 2 to 1000 carbons, with the more preferred halocarbons containing from 2 to 300 carbons and the most preferred containing from 2 to 150 carbon atoms. Additionally, the halocarbons containing at least one group of two adjacent carbons having chlorine and fluorine on adjacent carbons are the more preferred halocarbons. Examples of halocarbons are 2,2 - dichlorooctafluorobutane, polychlorotrifluoroethylene (Fluorolube (R) "S"), pentafluoroethyl bromide, 1,1,1 - trichlorotrifluoroethane, 1,1-dichloro-1-bromotrifluoroethane, 1-chloroheptafluoropropane, 2-chloroheptafluoropropane, 2-chlorononafluorobutane, 1 - iodononafluorobutane, 2,5 - dichloroperfluorohexane, 1-chloroperfluorododecane, 1-chloroheptafluorocyclobutane, 1,3-dichlorohexafluorocyclobutane, 1-chlorononafluorocyclopentane, 1 - iodoperfluorocyclohexane, 1-chloro-2-trifluoromethyl-perfluorocyclohexane, poly - 1,1-dichlorodifluoroethylene, and polybromotrifluoroethylene.

Examples of phosphorus compounds that may be utilized in the practice of the invention are trimethyl phosphite, tributyl phosphite, triisobutyl phosphite, triisopropyl phosphite, tripentyl phosphite, trihexyl phosphite, tris-(2-ethylhexyl) phosphite, triisooctyl phosphite, tridecyl phosphite, tridodecyl phosphite, diethyl butyl phosphite, tribenzyl phosphite, tris(2-chlorobenzyl) phosphite, tris(3-nonylbenzyl) phosphite, dibutyl benzyl phosphite, tris(2-phenethyl) phosphite, triallyl phosphite, trimethallyl phosphite, tristyryl phosphite, tris(2-chlorobutyl) phosphite, tris(3-bromopentyl) phosphite, tris(2-ethylthioethyl) phosphite, tris(diethylaminomethyl) phosphite, tributoxyethyl phosphite, didodecyl dodecylphosphonite, dihexyl allyphosphonite, di-(2-methoxyethyl) butyl phosphonite, dimethyl methylphosphonite, diisopropyl methylphosphonite, dibutyl butylphosphonite, dibutyl 2-chloropentylphosphonite, didodecyl decylphosphonite, di-(2-bromoethyl)-methylphosphonite, dibenzyl methylphosphonite, bis(2-phenethyl) butylphosphonite, diallyl allylphosphonite, dimethallyl allylphosphonite, distyryl methylphosphonite, dimethyl phenylphosphonite, dimethyl 2-chlorophenylphosphonite, diethyl 2-naphthylphosphonite, di(2 - ethylthioethyl) - 2 - ethylthioethylphosphonite, bis(diethylaminomethyl)ethylphosphonite, dibutoxyethyl butoxy ethylphosphonite, methyl dimethylphosphinite, isopropyl dimethylphosphinite, butyl di-(2-bromobutyl) phosphinite, dodecyl didecylphosphinte, 2-chloroethyl dimethylphosphinite, methyl dibenzylphosphinite, 2-phenethyl dibutylphosphinite, allyl diallylphosphinite, methallyl diallylphosphinite, styryl dimethylphosphinte, methyl diphenylphosphinite, ethyl di-(α-napthyl)phosphinite, 2-ethylthioethyl dibutylphosphinte, ethylaminomethyl diethylaminomethylphosphinite and butoxyethyl dibutoxyethylphosphinite.

The reactants of this invention may be reacted in molar ratios of from about 10:1 to 1:10, with the preferred molar ratios being about 3:1 to 1:3 and the most preferred molar ratio being about 1:1.

The reactions of this invention may be conducted at temperatures of from about 0 to 200 degrees centigrade. Many of the reactions may be carried out at temperatures of from about 0 to 150 degrees centigrade, however, it is preferred to operate at temperatures of from 25 to 100 degrees centigrade, as some of the reactions are exothermic in nature. These conditions may be varied when the reaction is carried out under subatmopheric and superatmospheric pressures, and when the reaction is carried out in the presence of a solvent. Solvents that may be utilized are those which are inert to conditions of reactions such as benzene, toluene, ether, petroleum ether, diethyl ether and so forth. The relative order of addition is unimportant, the results being equally as good when the halocarbon is added to the phosphorus compound or when the phosphorus compound is added to the halocarbon.

The following examples illustrate the invention, but are not to be interpreted as limiting in any respect. All parts are by weight and temperatures are in degrees centigrade unless otherwise stated.

*Example 1*

2,2-dichlorooctafluorobutane (27.1 parts) was added to a reaction vessel containing a solution of tributyl phosphite (25.0 parts) in benzene (88 parts) over a period of 20 minutes. The temperature of the reaction mixture was maintained at about 25 to 30 degrees centigrade. The mixture was stirred for a period of 45 minutes after the addition of the 2,2-dichlorooctafluorobutane. An iodine titer at this time indicated the absence of phosphite in the reaction mixture. The reaction mixture was then distilled. A fraction was recovered at from about 33 to 38 degrees centigrade, whose infrared spectrum showed the presence of 2-chloroheptafluoro-2-butene. This product was recovered in an 87 percent yield, based on the 2,2-dichlorooctafluorobutane. Another fraction was recovered at from about 85 to 87 degrees centigrade under 2 millimeters of mercury absolute. Infrared analysis of a sample of this fraction indicated the presence of dibutyl phosphorofluoridate. The yield of this product was 59 percent of theory.

Phosphorus analysis for dibutyl phosphorofluoridate was—

Percent phosphorus: Calculated, 14.6. Found, 14.4.

The infrared spectrum of the latter product contained a P—F bond at 11.4 microns, which was not present in dibutyl phosphorochloridate. The absence of dibutyl phosphorochloridate was further confirmed by an aniline test, which was negative.

*Example 2*

Example 1 was repeated utilizing 12.4 parts of trimethyl phosphite in place of the tributyl phosphite. The products obtained on distillation were identified by infrared analysis as 2-chloroheptafluoro-2-butene and dimethyl phosphorofluoridate.

*Example 3*

Example 2 was repeated without utilizing a solvent. 2-chloroheptafluoro-2-butene was recovered in 50 percent yield, and dimethyl phosphorofluoridate was recovered in 74 percent yield. The boiling point of the 2-chloroheptafluoro-2-butene was 32 to 34 degrees centigrade, and the boiling point of the dimethyl phosphorofluoridate was 38 to 44 degrees centigrade at 10 millimeters of mercury absolute.

Phosphorus analysis for dimethyl phosphorofluoridate was—

Percent phosphorus: Calculated, 24.2. Found, 23.0.

The infrared spectrum of this product contained a P—F bond at 11.3 microns which was not present in dimethyl phosphorochloridate. The product also showed sharp bands at 5.2 and 5.5 microns. The trap contents of the distillation were identified by infrared analysis as a mixture of methyl chloride and 2-chloroheptafluoro-2-butene.

*Example 4*

A polychlorofluorocarbon, (Fluorolube (R) "S") having an average molecular weight of 775 and a chlorine content of about 31 percent, (116 parts) was heated under nitrogen to about 100 degrees centigrade and to it was added tributyl phosphite (250 parts) over a period of 75 minutes. The exothermic reaction which occurred was controlled by adjusting the heat so that a temperature of 100 degrees centigrade was maintained. By-product butyl chloride was removed as it was formed in order to maintain the temperature at the desired 100 degrees centigrade. The reaction was deemed completed when butyl chloride was no longer being removed from the reaction mixture. Dibutyl phosphorofluoridate was recovered in an 80 percent yield. It had a boiling point of 107 to 113 degrees centigrade at 10 millimeters of mercury absolute, and a refractive index of $n^{24}_D$ 1.4044. An aniline test for chloridate was negative.

Distillation of the combined trap contents from all these operations gave butyl chloride with a boiling point of 78 to 80 degrees centigrade and a refractive index of $n^{24}_D$ 1.3998, in 50 percent yield. No butyl fluoride was detected.

Following the procedures of Examples 1 to 4, the reactants utilized in the following examples will react to give the products indicated:

Example 5
Reactants:
 Triisopropyl phosphite
 1,1,1-trichlorotrifluoroethane
Products:
 Diisopropyl phosphorofluoridate
 1,1-dichlorodifluoroethylene

Example 6
Reactants:
 Tri-sec-butyl phosphite
 Pentafluoroethyl bromide
Products:
 Di-sec-butyl phosphorofluoridate
 Tetrafluoroethylene

Example 7
Reactants:
 Tribenzyl phosphite
 1-iodononafluorobutane
Products:
 Dibenzyl phosphorofluoridate
 Perfluoro-1-butene

Example 8
Reactants:
 Triallyl phosphite
 2-chlorononafluorobutane
Products:
 Diallyl phosphorofluoridate
 Perfluoro-2-butene

Example 9
Reactants:
 Tris(2-chlorobutyl) phosphite
 2,2-dichlorooctafluorobutane
Products:
 Bis(2-chlorobutyl) phosphorofluoridate
 2-chloroheptafluoro-2-butene

Example 10
Reactants:
 Diisopropyl methylphosphonite
 1-chloroheptafluorocyclobutane
Products:
 Isopropyl methylphosphonofluoridate
 Perfluorocyclobutene

Example 11
Reactants:
 Bis(2-ethylthioethyl) ethylphosphonite
 1-chloroperfluorododecane
Products:
 2-ethylthioethyl ethylphosphonofluoridate
 Perfluoro-1-dodecene

Example 12
Reactants:
 Bis(diethylaminomethyl) phenylphosphonite
 1-chloro-2-trifluoromethylperfluorocyclohexane
Products:
 Diethylaminomethyl phenylphosphonofluoridate
 1-trifluoromethylperfluoro-2-cyclohexene

Example 13
Reactants:
 Methyl dimethylphosphinite
 Poly-1,1-dichlorodifluoroethylene
Products:
 Dimethylphosphinic fluoride
 Poly-1-chloro-2-fluoroacetylene

Example 14
Reactants:
 2-chloroethyl bis(2-chloroethyl) phosphinite
 Polybromotrifluoroethylene
Products:
 Bis(2-chloroethyl)phosphinic fluoride
 Polydifluoroacetylene

Example 15
Reactants:
 Methyl dibutyl phosphite
 Polychlorotrifluoroethylene
Products:
 Dibutyl phosphorofluoridate
 Polydifluoroacetylene While there have been described various embodiments of the invention, the compositions and methods described are not intended to be understood as limiting the scope of the invention, as it is realized that changes therein are possible and it is further intended that each element recited is to be understood as referring to all equivalent elements for accomplishing substantially the same results in substantially the same or equivalent manner, it covering the invention broadly in whatever form its principle may be utilized.

What we claim is:

1. A process for the preparation of a phosphorus compound containing a P—F bond selected from the group consisting of phosphorofluoridate, phosphonofluoridate and phosphinic fluoride and haloolefins or acetylene compound comprising reacting a phosphorus compound having the formula $$(R')_x\text{—P—}(OR)_{3-x}$$

where R is selected from the group consisting of alkyl having from 1 to about 20 carbons, aralkyl having from 7 to about 20 carbons, alkenyl having from 2 to about 20 carbons, substituted alkyl having from 1 to about 20 carbons, substituted aralkyl having from 7 to about 20 carbons, substituted alkenyl having from 2 to about 20 carbons, said substituent in each instance being inert under conditions of reaction, and mixtures thereof, R' is selected from the group consisting of R and aryl, substituted aryl, said substituent being inert under conditions of reaction, and mixtures thereof, and $x$ is 0 to 2, with a halocarbon having from 2 to 1000 carbons wherein at least one fluorine and one other halogen are on adjacent carbons.

2. A process for the preparation of a phosphorus compound containing a P—F bond selected from the group consisting of phosphorofluoridate, phosphonofluoridate and phosphinic fluoride and haloolefins or haloacetylene compound comprising reacting a phosphorus compound having the formula $$(R')_x\text{—P—}(OR)_{3-x}$$

where R is selected from the group consisting of alkyl having from 1 to about 20 carbons, aralkyl having from 7 to about 20 carbons, alkenyl having from 2 to about 20 carbons, substituted alkyl having from 1 to about 20 carbons, substituted aralkyl having from 7 to about 20 carbons, substituted alkenyl having from 2 to about 20 carbons, said substituent in each instance being inert under conditions of reaction, and mixtures thereof, R' is selected from the group consisting of R and aryl, substituted aryl, said substituent being inert under conditions of reaction, and mixtures thereof, and $x$ is 0 to 2, with a halocarbon having from 2 to 300 carbons wherein at least one fluorine and one other halogen are on adjacent carbons, whereby the phosphorus compound and haloolefin or haloacetylene compound is formed, and separating the phosphorus compound and haloolefin.

3. A process for the preparation of a phosphorus compound containing a P—F bond selected from the group consisting of phosphorofluoridate, phosphonofluoridate and phosphinic fluoride and haloolefins or acetylene compound comprising reacting a phosphorus compound having the formula $$(R')_x\text{—P—}(OR)_{3-x}$$

where R is selected from the group consisting of alkyl having from 1 to about 20 carbons, aralkyl having from 7 to about 20 carbons, alkenyl having from 2 to about 20 carbons, substituted alkyl having from 1 to about 20 carbons, said substituent being inert under the conditions of reaction, substituted aralkyl having from 7 to about 20 carbons, said substituent being inert under conditions of reaction, substituted alkenyl having from 2 to about 20 carbons, said substituent being inert under conditions of reaction, and mixtures thereof, R' is selected from the group consisting of R and aryl having from about 6 to about 24 carbons, substituted aryl having 6 to about 24 carbons, said substituent being inert under conditions of reaction, and mixtures thereof, and $x$ is 0 to 2, with a halocarbon having from 2 to 150 carbons wherein at least one fluorine and one other halogen are on adjacent carbons.

4. A process in accordance with claim 1 wherein the temperature of reaction is from 0 to 200 degrees centigrade.

5. A process in accordance with claim 1 wherein the reactants are added to one another in molar proportions of from 1:10 to 10:1.

6. A process in accordance with claim 1 wherein the reaction is carried out in the presence of a solvent.

No references cited.

CHARLES B. PARKER, *Primary Examiner.*

A. H. SUTTO, *Assistant Examiner.*